Figure 9:
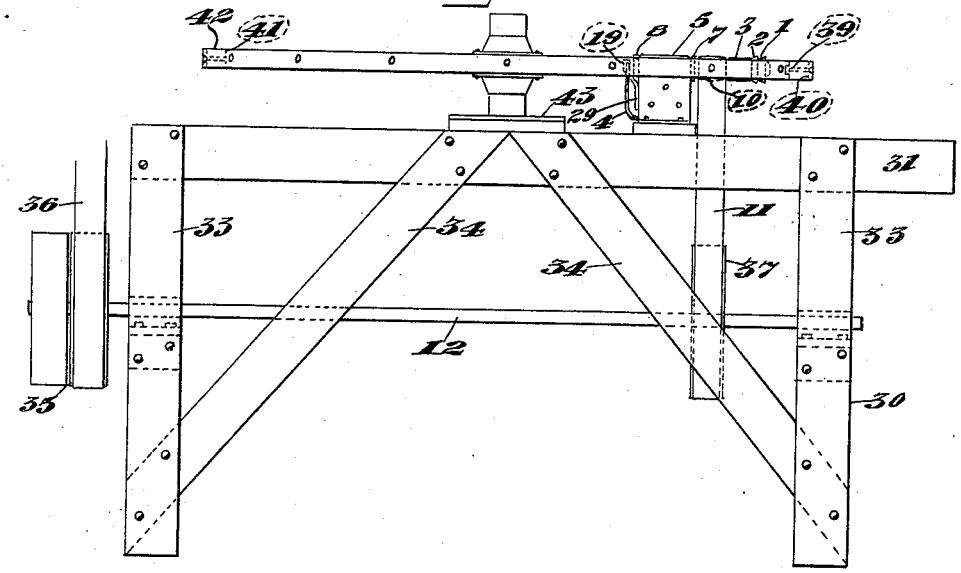

H. A. KRUEGER.
FRICTION CLUTCH.
APPLICATION FILED DEC. 31, 1908.
928,671.
Patented July 20, 1909.
3 SHEETS—SHEET 1.
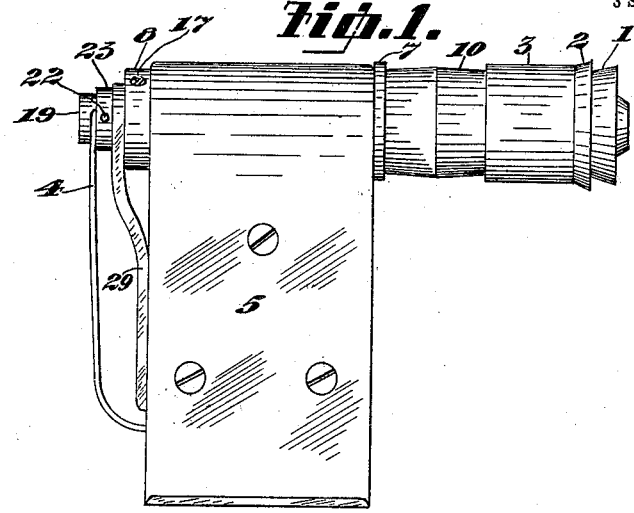
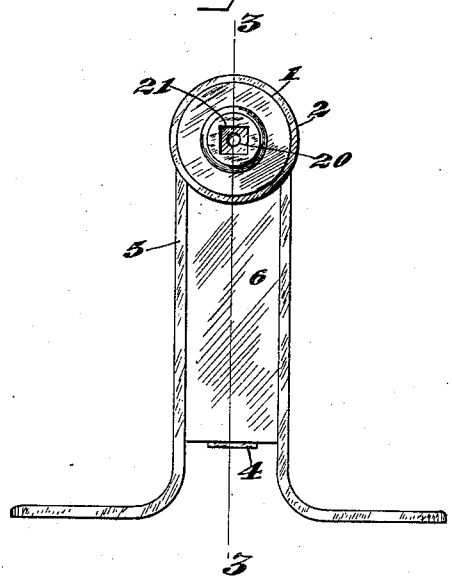
Witnesses:
J. Waldo Chrisinger.
Edna J. Gockel.
Inventor:
Helmuth A. Krueger,
By Hugh K. Wagner,
His Attorney.

H. A. KRUEGER.
FRICTION CLUTCH.
APPLICATION FILED DEC. 31, 1908.
928,671.
Patented July 20, 1909.
3 SHEETS—SHEET 2.
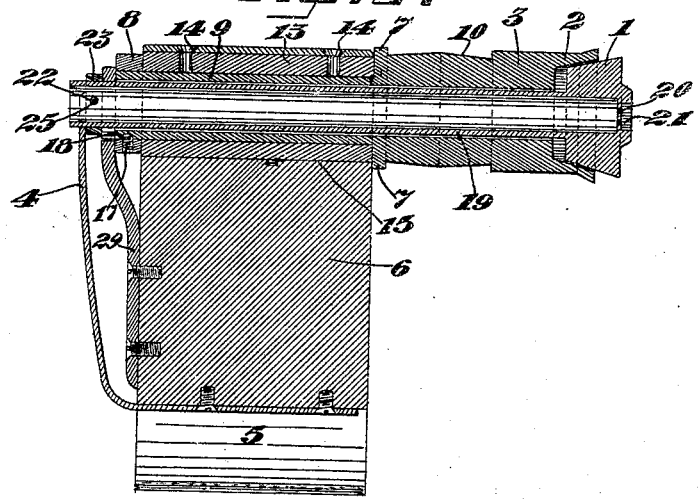
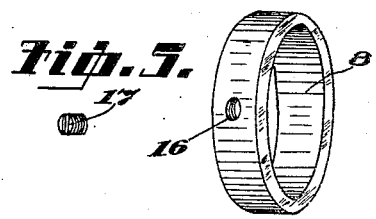
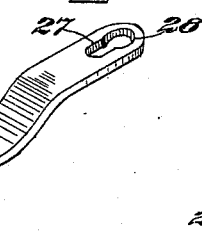
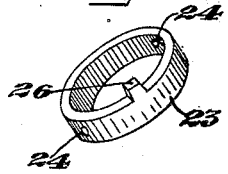
Witnesses:
J. Waldo Chriinger.
Edna J. Gockel.
Inventor:
Helmuth A. Krueger,
By Hugh K. Wagner
His Attorney.

H. A. KRUEGER.
FRICTION CLUTCH.
APPLICATION FILED DEC. 31, 1908.

928,671.

Patented July 20, 1909.
3 SHEETS—SHEET 3.

Witnesses:
J. Waldo Chrisinger.
Edna J. Gockel.

Inventor:
Helmuth A. Krueger,
By Hugh K. Wagner,
His Attorney.

UNITED STATES PATENT OFFICE.

HELMUTH A. KRUEGER, OF ST. LOUIS, MISSOURI, ASSIGNOR OF ONE-HALF TO GEORGE H. SCHELP, OF ST. LOUIS, MISSOURI.

FRICTION-CLUTCH.

No. 928,671.  Specification of Letters Patent.  Patented July 20, 1909.

Application filed December 31, 1908. Serial No. 470,186.

*To all whom it may concern:*

Be it known that I, HELMUTH A. KRUEGER, a citizen of the United States, residing at the city of St. Louis, State of Missouri, have invented certain new and useful Improvements in Friction-Clutches, of which the following is a specification, reference being had therein to the accompanying drawings.

This invention consists in new and useful improvements in friction clutches, the same being adaptable to various useful purposes, one of which is illustrated in the drawings and hereinafter described, in which the utilization of such clutch for tightening the nuts on tire bolts is exhibited.

Figure 10:
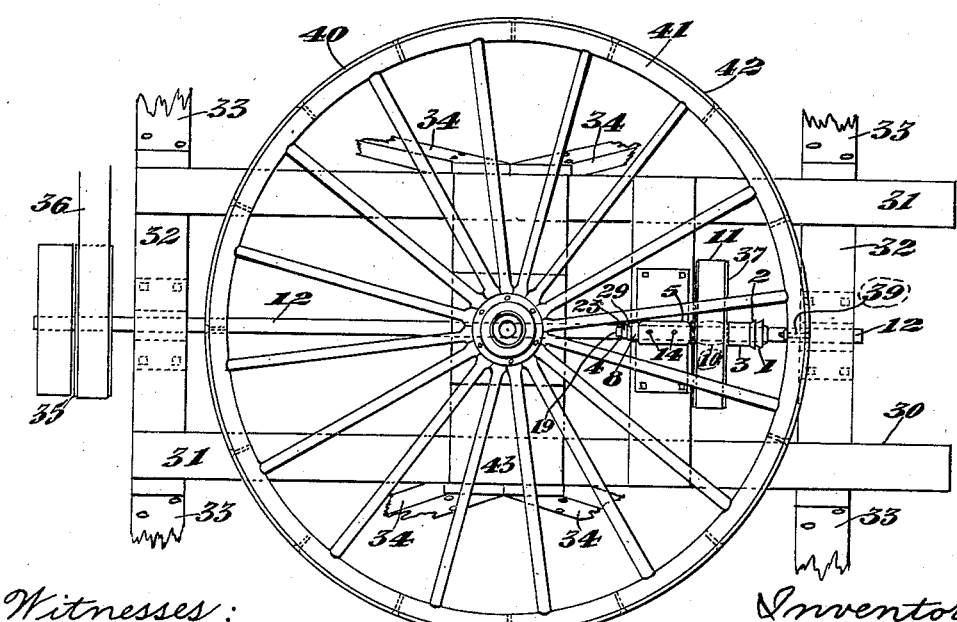

In the drawings forming part of this specification, in which like numbers of reference denote like parts wherever they occur, Figure 1 is a side elevation; Fig. 2 is an end elevation; Fig. 3 is a sectional view on the line 3—3 Fig. 2; Figs. 4, 5, 6, 7, and 8 are detail views of various parts; Fig. 9 is a side elevation showing the use of this friction clutch as a nut wrench for tightening nuts on tire bolts; and Fig. 10 is a top plan view of the same.

The friction clutch consists of the coöperating male cone 1 and female cone 2, the latter being contained in cylinder 3. Other parts for supporting or operating said cones are connected therewith. Male cone 1 is normally held out of frictional contact with female cone 2 by means of spring 4 which may be fastened to any suitable member, as, for instance, casing 5, but which is shown in the drawings as screwed to block 6. Block 6 may be either wood or metal or may be cast integral with casing 5.

A flange 7 on the same member bearing cylinder 3 bears against the top of casing 5 and prevents longitudinal travel of female friction cone 2 in one direction, while ring 8 at the other end of cylinder 9 formed integral with said member bearing said flange 7 and said female cone, prevents longitudinal movement in the opposite direction. Between said flange 7 and cylinder 3 is formed a friction surface 10, which may be engaged by a belt 11 driven by shaft 12 or said female cone 2 may be caused to rotate by any other suitable means.

A cylinder 13 is located within casing 5 above block 6 and is held from rotation by screws 14, said cylinder seating in rest 15 of block 6. Cylinder 9 is adapted to rotate in said cylinder 13 and to be supported thereby and thus to support cylinder 3 and connected parts. A perforation 16 through ring 8 receives a set-screw 17, which set screw seats in a recess 18 in cylinder 9, thereby so connecting ring 8 with said cylinder as to prevent longitudinal movement of said cylinder.

Hollow shaft 19 which bears at one end the male cone 1 passes through hollow cylinder 3, hollow cylinder 9, and through the hollow center of friction surface 10, the interior of male cone 1 being also hollow and connected by an opening 20 with socket 21 adapted to receive a nut, a tool, or other object to be actuated. A pin 22 fastens ring 23 to hollow shaft 19, said ring and said hollow shaft thus moving together, said pin passing through an opening or plurality of openings 24 in said ring 23, and through registering openings 25 in hollow shaft 19. Spring 4 bears against ring 23 and thus pushes hollow shaft 19 in such manner as to keep male cone 1 out of engagement with female cone 2. To cause the same to engage, suitable pressure must be applied to male cone 1 to overcome the pressure of spring 4. When this is done and the two cones are in close frictional contact the rotation of the female cone, as, for instance, by a belt passing over friction surface 10, will cause both cones to rotate in unison and produce an operative result from the action of male cone 1, as, for instance, through the instrumentality of socket 21 in either turning a nut as hereinafter described, or operating a tool, or accomplishing any other useful purpose.

Cone 1 is prevented from accidental revolution by reason of chance contact with cone 2 by the lug 26 on ring 23, said lug seating in a notch 27 of opening 28 in plate 29. When pressure is positively applied to force cone 1 into engagement with cone 2, said lug 26 will be pushed out of said notch 27, leaving hollow shaft 19 free to rotate, carrying cone 1 with it. Plate 29 provides a bearing for shaft 19.

Since one of the uses for which this clutch is particularly adapted is that of tightening nuts on the tire bolts of wheels, it should be observed that when used for that purpose the opening 20 between the socket 21 and hollow interior of male cone 1 is adapted to receive the end of the bolt on which said nut is screwed home by the operation of this clutch, the end of said bolt protruding through opening 20 into said hollow interior of cone 1.

The manner of using said clutch for tightening nuts on tire bolts will now be described, the same being more particularly illustrated in Figs. 9 and 10. Shaft 12 is supported by main frame 30 which may be of either wood or metal or any other desired material and preferably comprises beams 31, cross-pieces 32, standards 33, and braces 34. Said shaft is driven by tight pulley 35 by means of belt 36 coming from a suitable source of power. Another pulley 37 is mounted on shaft 12 and driven thereby and actuates belt 11 which passes over the friction surface 10 connected with cylinder 3 containing the female friction cone 2. When male cone 1 is in engagement with female cone 2 said male cone is rotated by the rotation of said cone 2 by means of said belt 11. Socket 21 is squared to receive a nut located and "started" on a bolt 39, which is one of a plurality of similar bolts that have previously been run through a tire 40 and felly 41 of wheel 42. The nuts having been "started" on all the bolts, the wheel is placed on the supporting member 43 of the main frame of the machine, and, with the friction cones 1 and 2 located between the spokes of the wheel, the wheel is moved toward said cones so as to cause one of said bolts to enter opening 20 and one of said nuts to enter socket 21. Pressure of the wheel against the projecting end of cone 1 forces same farther into, and into frictional contact with, the female cone 2 against the pressure of spring 4, which normally tends to force said cones out of engagement with each other by bearing against the end or a part connected with the end of hollow shaft 19, which, at the end thereof opposite said spring 4, bears the male cone 1.

Having thus described my said invention, what I claim and desire to secure by Letters-Patent is:

1. In a machine of the character described, the combination of a pair of cylinders, each bearing a friction-cone, a spring, a ring upon the inner cylinder, means for fastening the same thereto, said spring pressing against said ring, means for rotating said cones in unison when said cylinder is pressed back against said spring, a fixed plate containing a notch, and a lug upon said ring normally entering said notch.

2. In a machine of the character described, the combination of a main-frame, a casing, a spring, a pair of cylinders held by said casing, one of said cylinders telescoping the other, one of said cylinders being pressed by said spring and bearing a male friction-cone having an opening therethrough, said other cylinder bearing a female friction-cone, and means for rotating said cones in unison when the male cone is pressed into contact with the female cone.

3. In a machine of the type set forth, the combination with a support, of a shaft, a male cone borne by said shaft at one end thereof, a cylinder surrounding the shaft and being rotatable with respect thereto, said cylinder being journaled in said support, a female cone at one end of said cylinder to coöperate with said male cone, a member rigidly secured to said support and provided with a notch, a projection carried by said shaft to engage in said notch to hold said shaft normally against rotation, and resilient means acting on said shaft to normally maintain said projection thereof in said notch.

4. In a machine of the type set forth, the combination with a support, of a cylinder journaled therein, a shaft extending through said cylinder, coöperating friction cones carried by said shaft and cylinder at one end thereof, said shaft being spring pressed and being slidable with respect to said cylinder, a stationary member carried by the support formed with a notch disposed adjacent the opposite end of said shaft, and a projection carried by the shaft to normally extend in said notch.

5. In combination with a support, a cylinder journaled therein, a slidable shaft extending through said cylinder, coöperating cones borne by said shaft and cylinder at one end thereof, means at the opposite end of said shaft for normally locking the same against rotation means to coöperate with said locking means, and means to normally render said locking means effective.

6. In combination with a support, a cylinder held therein, a pair of members slidable with respect to each other, a pair of coöperating friction cones borne by said members, a projection carried by the shaft, stationary means formed to receive said projection to thereby normally lock said shaft against rotation, and means to normally retain said projection in said receiving means.

7. In a machine of the type set forth, a pair of telescopic members, coöperating friction cones carried by said members at one end thereof, one of said members being slidable with respect to the other, a stationary element at the opposite end of said slidable member for interlocking engagement with said slidable member, and means engaging said slidable member to normally maintain the same locked to said stationary element.

8. In a machine of the type set forth, a casing, a cylinder immovably affixed to said casing, a second cylinder rotatably mounted in said first cylinder, a collar on said second cylinder abutting one end of said first cylinder, said second cylinder being formed with an annular friction surface and with a female cone at one end, a shaft projected through said second cylinder bearing a male cone on one end coöperating with said female cone, a second collar secured to said second cylinder at its opposite end and bearing against the opposite end of the first cylinder, and a spring carried by the casing and bearing against the opposite end of the shaft to normally maintain said cones out of contact with each other.

9. In a machine of the type described, a support, a pair of telescoping members extending through said support so as to have their ends project beyond the opposite sides thereof, coöperating friction cones carried by said members at one end thereof, one of said members being slidable with respect to the other, and a spring on said support engaging said slidable member at the opposite end thereof to normally maintain said friction cones out of engagement with each other.

10. In a machine of the type described, a support, a pair of members projected through said support so as to be on opposite sides thereof, coöperating friction cones on one end of said members, one of said members being slidable with respect to the other, means carried by said slidable member at its opposite end for interlocking engagement with the support, and means to normally retain said slidable member in interlocking engagement against rotation with respect to said support.

11. In a machine of the type described, a support, a pair of members carried by the support to have their ends project on opposite sides thereof, coöperating friction cones carried by said members at one end thereof, one of said members being slidable with respect to the other, and means at the opposite end of said members coöperating with the support to lock the slidable members against rotation with respect to the support.

12. In a machine of the type set forth, a support grooved upon one surface and retaining therewithin a sleeve normally stationary, a rotatable cylinder partly incased by said sleeve, a reciprocatively slidable and rotatable cylinder partly incased by said first cylinder, a stationary member normally carried upon said grooved support and contiguous to and encircling said slidable cylinder, an orifice in said stationary member, said cylinders having at one of their extremities dovetailing friction surfaces, the outer of said surfaces having means to engage a tool or nut, a member adjustably and detachably fixed upon the outer periphery of said slidable cylinder and having means to engage said orifice in said stationary member, resilient means to hold said dovetailing friction surfaces out of engagement, said resilient means extending adjacent to said cylinders, and means whereby said rotatable cylinder held partly within said sleeve may be driven.

In testimony whereof I have affixed my signature in presence of two witnesses.

HELMUTH A. KRUEGER.

Witnesses:
   GLADYS WALTON,
   EDNA J. GOCKEL.